United States Patent
Martin et al.

(10) Patent No.: US 7,821,457 B2
(45) Date of Patent: Oct. 26, 2010

(54) METHOD AND DEVICE FOR AUTOMATICALLY DETERMINING THE POSITION OF TRANSCEIVERS OF NAVIGATION SIGNALS

(75) Inventors: Sven Martin, Munich (DE); Susanne Schloetzer, Munich (DE); Michael Voith Von Voithenberg, Neudrossenfeld (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 12/236,113

(22) Filed: Sep. 23, 2008

(65) Prior Publication Data

US 2009/0102720 A1 Apr. 23, 2009

(30) Foreign Application Priority Data

Sep. 24, 2007 (DE) .................. 10 2007 045 711

(51) Int. Cl.
*G01S 3/02* (2006.01)
*G01S 7/40* (2006.01)
(52) U.S. Cl. .................. 342/463; 342/174; 342/450
(58) Field of Classification Search .............. 342/165, 342/174, 450, 451, 463
See application file for complete search history.

(56) References Cited

U.S. PATENT DOCUMENTS 6,256,475 B1 * 7/2001 Vannucci .............. 455/12.1
2005/0015198 A1 1/2005 Kee et al.
2005/0080563 A1 4/2005 Petrovski et al.
2006/0100781 A1 * 5/2006 Lin et al. .............. 701/216
2009/0048779 A1 * 2/2009 Zeng et al. .............. 701/214

FOREIGN PATENT DOCUMENTS

DE 10 2004 043 524 A1 5/2005

OTHER PUBLICATIONS

Office Action in German Patent Application No. 10 2007 045 711.3-54 dated Apr. 13, 2010.
LeMaster, Edward A., et al., "Field Demonstration of a Mars Navigation System Utilizing GPS Pseudolite Transcrivers," Position Location and Navigation Symposium, 2002, pp. 150-155.
Matsuoka, Masayoshi, et al., "Autonomous Deployment of a Self-Calibrating Pseudolite Array for Mars Rover Navigation," Position Location and Navigation Symposium, 2004. PLANS 2004, pp. 733-739.
Park, Byungwoon Park, et al., "A Feasibility Study on the Regional Navigation Transceiver System Using a Transceiver Position Estimation Algorithm," ION GNSS 19th International Technical Meeting of the Satellite Division, vol. 1, pp. 114-125 (2006).

* cited by examiner

*Primary Examiner*—Dao L Phan
(74) *Attorney, Agent, or Firm*—Crowell & Moring, LLP

(57) ABSTRACT

A method and system for automatically determining the position of transceivers of navigation signals using a utilization system for the navigation signals are provided. First, coarse calibration of the coordinates of the transceivers is performed. Next, a trajectory of the utilization system is estimated. Finally, fine calibration of the coordinates of the transceivers and the trajectory of the utilization system is performed.

20 Claims, 5 Drawing Sheets

METHOD AND DEVICE FOR AUTOMATICALLY DETERMINING THE POSITION OF TRANSCEIVERS OF NAVIGATION SIGNALS

CROSS REFERENCE TO RELATED APPLICATIONS

This application claims priority under 35 U.S.C. §119 to German Patent Application No. 10 2007 045 711.3-54, filed Sep. 24, 2007, the entire disclosure of which is herein expressly incorporated by reference.

BACKGROUND AND SUMMARY OF THE INVENTION

The invention relates to a method for automatically determining the position of transceivers of navigation signals.

Satellite systems for global navigation (GNSS; GNSS=global navigation satellite system) are used for position finding and navigation on the ground and in the air. GNSS systems, such as the European satellite navigation system that is currently under construction (hereinafter also referred to as the Galileo system or simply Galileo), comprise a plurality of satellites or pseudolites, an earth-based receiver system, which is connected to a central calculating station, and utilization systems, which evaluate and use the navigation signals, transmitted from the satellites or pseudolites.

In general it is necessary to know in a navigation environment, in particular a GNSS, the exact position of the transmitters, which are beaming the navigation signals for reception by the utilization systems, in a coordinate system. In a satellite navigation system it is very important to know the Kepler parameters for the orbits of satellites for an exact navigation. Usually the exact positions of terrestrial GNSS—that is, pseudolite systems—are determined using a complicated calibration of the transmitters of the navigation signals. Initial attempts have already been made to determine the positions of the navigation transmitters by means of a self-calibration.

The following publications describe the self-calibration of transmitters of navigation signals:

"Self-Calibration of Pseudolite Arrays Using Self-Differencing Transceivers", E. A. LeMaster, S. M. Rock, Proceedings of the Institute of Navigation GPS-99 Conference, Nashville, Tenn., September 1999, pp. 1549-1558;

"Field Test Results for a Self-Calibrating Pseudolite Array", E. A. LeMaster, S. M. Rock, Proceedings of the Institute of Navigation GPS 2000 Conference, Salt Lake City, September 2000, pp. 1046-1055;

"An Improved Solution Algorithm for Self-Calibrating Pseudolite Arrays", E. A. LeMaster, S. M. Rock, Institute for Navigation National Technical Meeting, San Diego, Calif., January 2002;

"Field Demonstration of a Mars Navigation System Utilizing GPS Pseudolite Transceivers", E. A. LeMaster, S. M. Rock, Position, Location, and Navigation Symposium, Palm Springs, Calif., April 2002; and "3-D Capabilities for GPS Transceiver Arrays", M. Matsuoka, E. A. LeMaster, S. M. Rock, Proceedings of the Institute of Navigation GPS 2002 Conference, Portland, Oreg., September 2002, pp. 824-834.

The major drawback with the methods and the systems described in these publications is that a utilization system has to be designed as a transceiver and, thus, has to be also able to transmit, a feature that is not always desired, especially in the case of military applications. If there are a number of users in the navigation system, then it is advantageous with respect to a limited bandwidth if the individual users do not have to transmit any navigation signals. Another drawback with the design of the utilization system as the transceiver is that complex, weight and cost-intensive hardware is required for the utilization system.

Therefore, exemplary embodiments of the present invention provide a method and a device for automatically determining the position of transceivers of navigation signals. In this case a utilization system for self-calibration does not have to be designed as the transceiver.

Exemplary embodiments of the invention involve applying a multi-step self-calibrating algorithm for transceivers of navigation signals using a utilization system for determining the position of the transceivers. According to such an algorithm, the self-calibration of a network of transceivers is carried out in three steps:

1. coarse calibration of the coordinates of the transceivers;
2. estimate of the trajectory of the utilization system; and
3. fine calibration of the coordinates of the transceivers and the trajectory of the utilization system on the basis of the coarse calibration and the estimate of the trajectory.

The self-calibration of the transceiver coordinates significantly reduces the amount of time required to set up a local navigation environment, for example, for a temporary landing field or for indoor navigation in certain buildings. Furthermore, it is not necessary to design a utilization system as a navigation transmitter, a feature that is very important for military applications in order to avoid detection by an enemy. The application of passive utilization systems makes it possible, in light of limited bandwidths, that the number of users in the navigation environment does not have to be restricted. Finally the invention allows the use of lightweight and inexpensive user hardware.

According to one aspect of the present invention, a method for automatically determining the position of transceivers of navigation signals with the use of a utilization system for the navigation signals and has the following steps:

a) coarse calibration of the coordinates of the transceivers;
b) estimate of the trajectory of the utilization system; and
c) fine calibration of the coordinates of the transceivers and the trajectory of the utilization system on the basis of the coarse calibration and the estimate of the trajectory.

In another aspect of the invention, the distance between two transceivers is determined using the coarse calibration.

According to an additional aspect of the invention, self-differenced observation equations can be used for the coarse calibration. This procedure makes possible the direct observation of the distance between two transceivers.

Furthermore, according to one aspect of the invention, the method can be designed in such a manner that, after the distance between all transceivers has been determined, a rough estimate of the coordinates of the transceivers can be made by triangulation of the determined distance between the transceivers. In this way the transceivers can be arranged in a local coordinate system.

An additional aspect of the invention provides that a local coordinate system is used, in order to determine the coordinates of the transceivers, and the optimal position of the coordinate system with respect to the transceivers is automatically sought. The introduction of a local coordinate system makes it possible to restrict the system because within a network of transceivers only positioning in relation to each other is possible. Furthermore, owing to the automatic search for the optimal position of the coordinate system, it is possible to improve the success rate of the self-calibration even in the case of difficult geometries and extremely noisy measurements.

In another aspect of the invention, the starting position of the utilization system is determined after step a), but before step b) is carried out.

For a first estimate of the starting position of the utilization system, one aspect of the invention provides that double differenced pseudoranges can be used as the observation variable. In this way the clock errors of the transceivers and the navigation system are compensated, if the transmitters for the navigation signals in the transceivers are not synchronized.

Furthermore, in one aspect of the invention, the starting position of a utilization system can be determined by a grid network search, based on a minimization of measurement residuals.

In another aspect of the invention, the sum of squared measurement residuals is determined for each grid network point and used as the test variable, in order to differentiate between the different test candidates of the grid network points for the starting position.

According to one aspect of the invention, that grid network point that yields the minimum sum of squared measurement residuals can be selected as the first estimate of the starting position.

According to another aspect of the invention, the grid network search is carried out in the first step with a coarse grid network, which covers the total area of the navigation environment, and in the subsequent step with a fine grid network, which is spanned around the grid network point, selected in the previous step.

According to an additional aspect of the invention, the dimensions of the test area for determining the starting position of the utilization system are determined by means of the coarse-calibrated coordinates of the transceivers.

According to another aspect of the invention, the trajectory of the utilization system can be estimated using an iterative least square approach while simultaneously exploiting the small dynamics of the utilization system in a linearization of the observation equations.

According to one aspect of the invention, only low noise phase measurements of the navigation signals, transmitted by the transceivers, are used for the fine calibration of the coordinates of the transceivers and the trajectory of the utilization system.

In an additional aspect of the invention, the fine calibration of the coordinates of the transceivers and the trajectory of the utilization system is carried out using an iterative least square approach.

For the iterative least square approach, a Taylor series development of the observation equations is carried out, according to one aspect of the invention. Either this Taylor series development is terminated after the linear term, and then a standard iterative least square method is employed for the fine calibration, or the Taylor series development is terminated after the quadratic term, and then a quadratic iterative least square method is employed.

In another aspect of the invention, double differenced observation equations are used for the fine calibration.

Finally, in one aspect of the invention, so many iterations are carried out in the framework of the iterative least square approach until either the convergence criterion or the divergence criterion is fulfilled, or the maximum allowable number of iterations is exceeded.

Furthermore, one aspect of the invention provides that the fine calibration is repeated with the use of the results that vary from the results of the coarse calibration.

In addition, in one aspect the invention relates to a computer program for carrying out the method of the invention.

An additional aspect of the invention provides a computer program product, which comprises a machine readable program carrier, on which a computer program is stored, according to the invention, in the form of electronically and/or optically readable control signals.

Furthermore, the invention relates, according to one aspect, to a device for automatically determining the position of the transceivers of navigation signals with the use of a utilization system for the navigation signals. In this case the device comprises:

a first means for coarse calibration of the coordinates of the transceivers;

a second means for estimating the trajectory of the utilization system; and a third means for the fine calibration of the coordinates of the transceivers and the trajectory of the utilization system.

Furthermore, one aspect of the invention provides four means for determining the starting position of the utilization system.

The first to fourth means can be implemented, in particular, by means of a processor and a memory, in which is stored a program of the invention for execution by the processor.

Other advantages and possible applications of the present invention are disclosed in the following description in conjunction with the embodiments depicted in the drawings.

BRIEF DESCRIPTION OF THE DRAWINGS

The terms that are used in the attached list of reference numerals and their assigned reference numerals are used in the description, in the claims, in the abstract and in the drawings.

The drawings show in

DETAILED DESCRIPTION OF THE DRAWINGS

Figure 1:
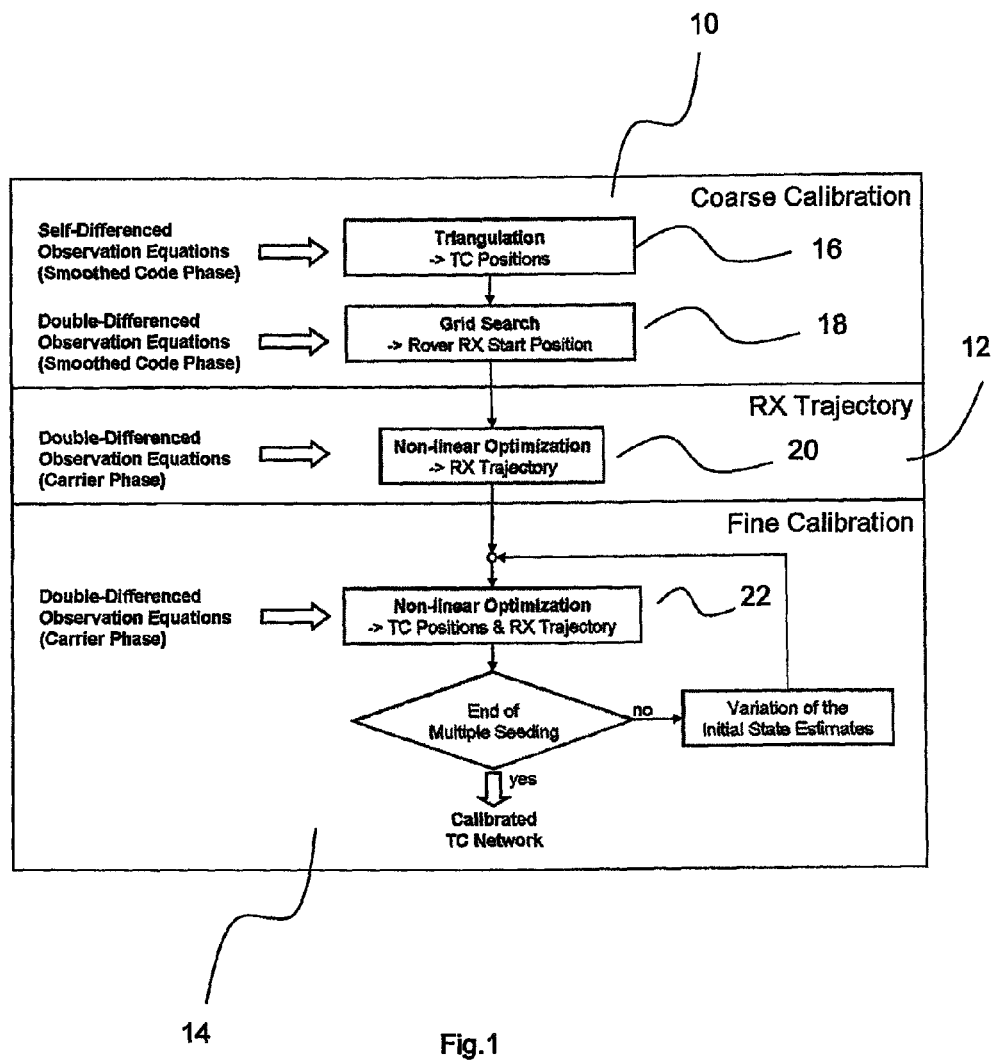
FIG. 1 the schematic sequence of an embodiment of the self-calibration of a transceiver network, according to the invention.

The same and/or functionally identical elements are provided below with the same reference numerals. The absolute values and the measurement data provided in the following are merely exemplary values and are not intended to restrict the invention to such dimensions.

Figure 2:
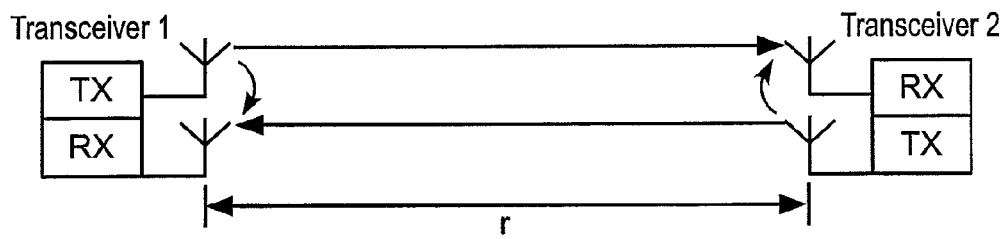
FIG. 2 the self-differencing between two transceivers.

A transceiver (TC) comprises, for example, a GNSS pseudolite and a GNSS receiver. The following description of the algorithms assumes that two separate antennas are used, as shown in FIG. 2, by the transceivers for transmitting and receiving. The following system requirements should be fulfilled for a self-calibration, so that the transceiver network can successfully calibrate itself:

a) two dimensional TC network: $\geq 4$ TCs, which span the plane b) three dimensional TC network: ≧5 TCs, which span the space.

In addition to the TCs, a mobile user receiver should be available for the fine calibration of the system. The schematic sequence of the self-calibration algorithm is shown in FIG. 1.

As illustrated in FIG. 1, the self-calibration of the TC network takes place in three steps:
1) coarse calibration
2) estimate of the trajectory of the utilization system and/or user receiver
3) fine calibration The individual steps are described in detail below.

1) Coarse Calibration

The TC coordinates and the user receiver coordinates are coarse-calibrated in a static setup. Self-differenced observation equations are used for the coarse calibration of the TC coordinates. The procedure for the self-differencing between two transceivers is depicted in FIG. 2.

Owing to the self-differencing of the pseudoranges between two TCs, the distance r between the two TCs can be directly observed. In this case the simplification is made that the TX antenna and the RX antenna of the same TC are located at almost the same place.

$$\nabla \Delta \rho_{i,j}(t) = \rho_i^j(t) - \rho_i^i(t) + \rho_j^i(t) - \rho_j^j(t) = \quad \text{Equation (1)}$$

$$2 \cdot \left\| \begin{pmatrix} x_j \\ y_j \\ z_j \end{pmatrix} - \begin{pmatrix} x_i \\ y_i \\ z_i \end{pmatrix} \right\| + \nabla \Delta v_{\rho\_i,j}(t)$$

where
$\rho$: pseudorange measurement
$v_\rho$: pseudorange noise on the basis of all error sources (receiver noise, multipath propagation)

The indices i and j stand for the i-th or j-th TC. The self-differencing produces the double distance r between the two TCs.

$$r_{i,j} \approx \frac{\nabla \Delta \rho_{i,j}(t_0)}{2} \quad \text{Equation (2)}$$

Once the distances between all TCs in the network are known, then a rough estimate of the TC coordinates can be made by triangulation.

Since only positioning in relation to each other is possible inside the TC network, the system is restricted through the introduction of a coordinate system. For two dimensional systems three additional restrictions are introduced, and for three dimensional systems six additional restrictions are introduced on the grounds of the degrees of freedom of the system with respect to translation and rotation. In order to simplify the following exemplary observations, the following restrictions are imposed on the local TC coordinates in this description.

1. TC1* shall come to lie in the coordinate origin of the coordinate system (x1*=0, y1*=0, z1*=0).
2. TC2* shall come to lie along the positive x axis of the coordinate system (y2*=0, z2*=0).
3. TC3* shall lie in the xy plane and exhibit a positive y value (y3*>0, z3*=0).

In the case of a three dimensional TC network the following shall also apply:

4. TC4* shall span the space and exhibit a positive z value (z4*>0).

The algorithm may be configured in such a manner that it automatically searches for the optimal position for the local Cartesian coordinate system. In this way the success rate of the self-calibration is improved even in the case of difficult geometries, for example, when three TCs are set up almost co-linearly, and extremely noisy measurements, assuming there are redundant TCs in the network.

In the case of two dimensional TC networks one may proceed as follows:

If n is the number of TCs in the network, then $$\binom{n}{3}$$

reference triangles can be formed. The TC triangle, which most resembles an equilateral triangle, is chosen as the reference triangle for spanning the coordinate system.

$$\min \left[ \sum_{n=1}^{3} \left| \alpha_n - \frac{\pi}{3} \right| \right] \quad \text{Equation (3)}$$

where $\alpha_1 = \angle(TC2, TC1, TC3)$ $\alpha_2 = \angle(TC3, TC2, TC1)$ $\alpha_3 = \angle(TC2, TC3, TC1)$ In the case of three dimensional TC networks one may proceed as follows:

3D positioning with ≧4TCs is possible only if at least 1 TC comes adequately out of the plane. If n is the number of TCs in the network, then $$\binom{n}{4}$$

reference tetrahedrons can be formed. The TC tetrahedron with the largest volume is selected as the reference tetrahedron, provided there are redundant TCs in the network:

$$\max \left[ abs \left( \begin{vmatrix} x_1 & y_1 & z_1 & 1 \\ x_2 & y_2 & z_2 & 1 \\ x_3 & y_3 & z_3 & 1 \\ x_4 & y_4 & z_4 & 1 \end{vmatrix} \right) \right] \quad \text{Equation (4)}$$

where $x_1 = y_1 = z_1 = y_2 = z_2 = z_3 = 0$

Figure 3:
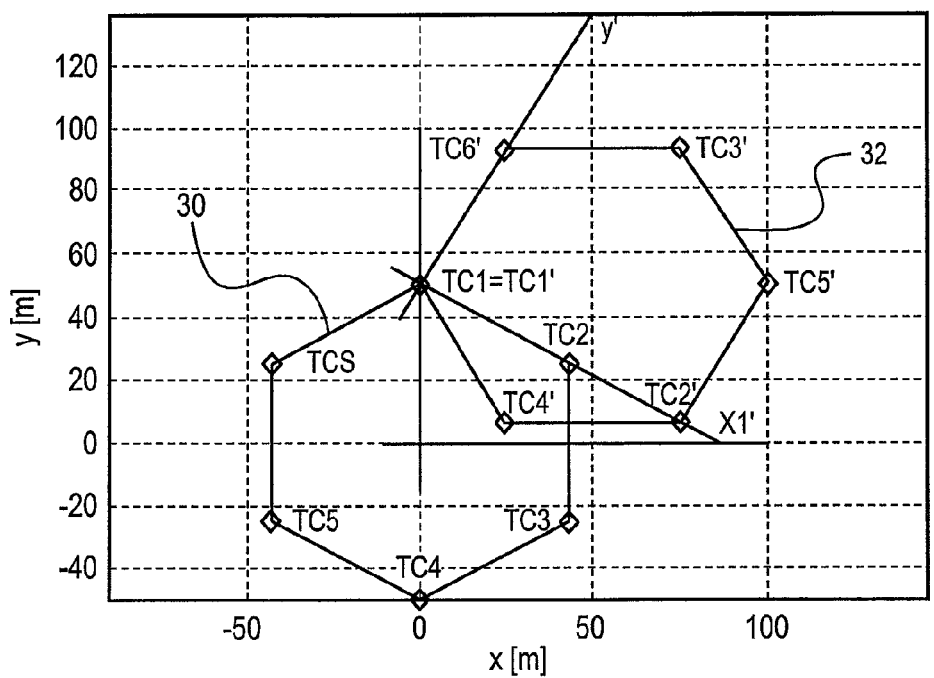
FIG. 3 an embodiment for the actual position of the TCs in the network as compared to the position in the local coordinate system after the self-calibration.

The procedure for spanning the local Cartesian coordinate system for a two dimensional TC network is illustrated in FIG. 3. In this case the actual position (reference numeral 30) of the TCs in the network is opposite the position (reference numeral 32) in the local coordinate system after the self-calibration. In addition, the TC indices are resorted. For example, TC1 changes to TC1*, whereas TC3 changes to TC2*, and TC5 changes to TC3*.

Figure 4:
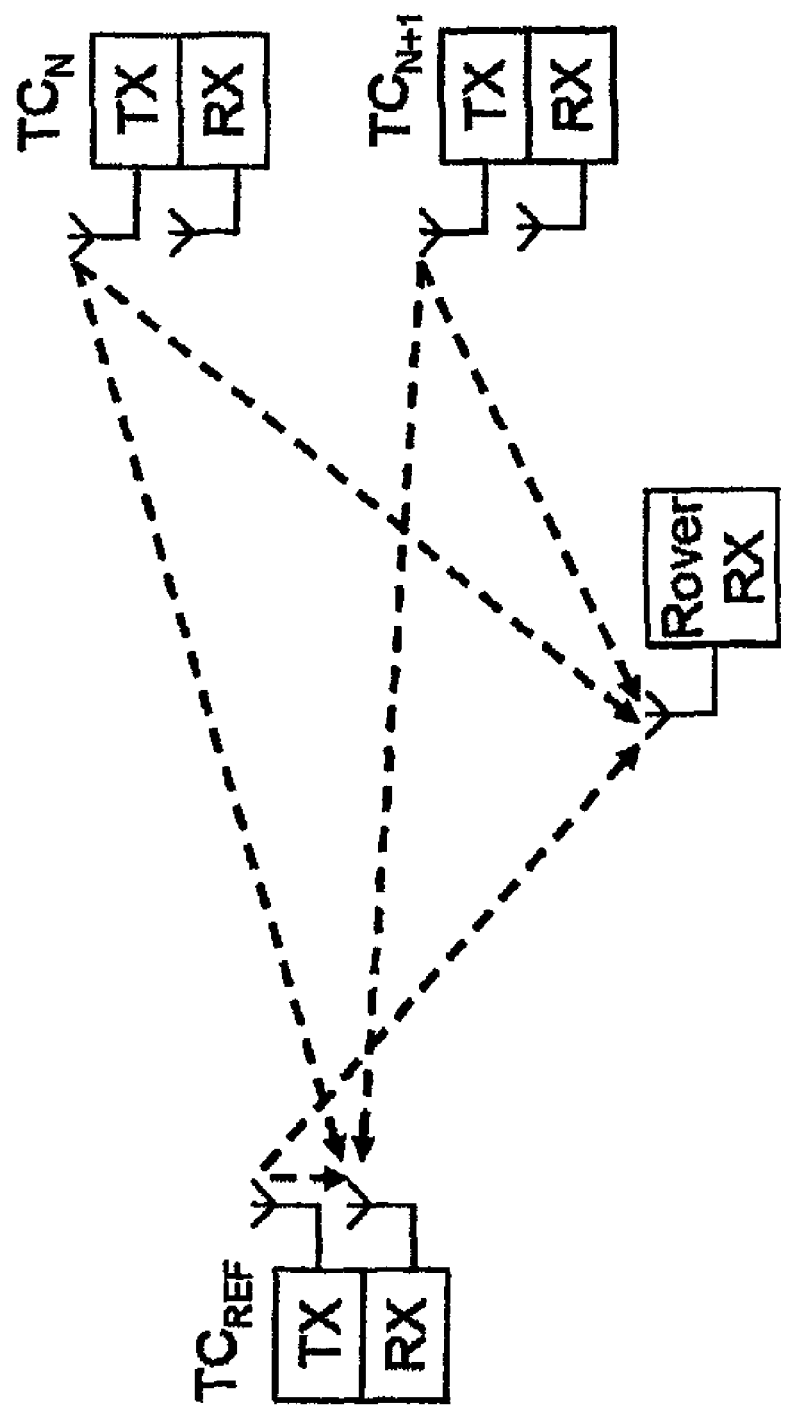
FIG. 4 the double differencing in the transceiver network.

Following a coarse calibration of the TC locations using triangulation, the coordinates of the user receiver (called "rover RX" in FIG. 4) can be determined. The user receiver can be situated inside or even outside the polygon spanned by the TCs.

For the first estimate of the starting position of the user receiver, double differenced pseudoranges are used as the observation variables.

The use of double differences has the effect that potential clock errors drop out and/or are compensated in essence, when the transmitters in the TC network are not synchronized. Since the distance between the user and the TCs is not directly observable, a grid network search is conducted. The object of the search is to find the user position that results in a minimum of measurement residuals. The double differenced observation equations in the TC network can be formulated, according to FIG. 4, as follows:

$$\nabla \Delta \rho_{Ro,PLR_{REF}}^{PLT_{REF},PLT_N} = \rho_{Ro}^{PLT_N} - \rho_{PLR_{REF}}^{PLT_N} - \rho_{Ro}^{PLT_{REF}} + \rho_{PLR_{REF}}^{PLT_{REF}} \quad \text{Equation (5)}$$

The indices have the following meaning:
PLT—pseudolite transmitter
PLR—pseudolite receiver
Ro—rover receiver The receiver of TC1* is always used as the reference receiver, and the transmitter of TC1* is always used as the reference transmitter in forming the difference. In addition to the measured double differenced observation equations, theoretical double differences can also be calculated for each user position in the grid network.

$$r_{Ro0}^{PLT} = \sqrt{(x^{PLT} - x_{Ro0})^2 (y^{PLT} - y_{Ro0})^2 + (z^{PLT} - z_{Ro0})^2} \quad \text{Equation (6)}$$

$$\nabla \Delta \hat{\rho}_{Ro0,PLR_{REF}}^{PLT_{REF},PLT_N} = r_{Ro0}^{PLT_n} - r_{PLR_{REF}}^{PLT_n} - r_{Ro0}^{PLT_{REF}} \quad \text{Equation (7)}$$

where
$x_{Ro0}, y_{Ro0}, z_{Ro0}$—x, y, and z coordinates of a candidate for the user starting position (grid network point)
$x^{PLT}, y^{PLT}, z^{PLT}$—x, y, and z coordinates of the coarse-calibrated transmitting stations.

Since it is assumed that the RX antenna and the TX antenna of TC1* are situated at the same location, the distance $$r_{PLR_{REF}}^{PLT_{REF}}$$

does not appear in equation 7. In the next step the difference is derived from the measured double differenced observation equations and the expected double differenced observation equations for a specific grid network point:

$$dr(N-REF) = \nabla \Delta \rho_{Ro0,PLR_{REF}}^{PLT_{REF},PLT_N} - \nabla \Delta \hat{\rho}_{Ro0,PLR_{REF}}^{PLT_{REF},PLT_N} \quad \text{Equation (8)}$$

where N=2 . . . number of TCs in the network.

The product is the number of TCs in the network minus 1 residual dr for a single test candidate Ro0 for the starting position of the user. The sum of squared measurement residuals (S) is determined for each grid network point and used as the test variable, in order to distinguish between the different test candidates for the user starting position:

$$S = \sum_{i=1}^{N-1} dr(i)^2 \quad \text{Equation (9)}$$

The grid network point that yields the minimum sum of squared measurement residuals is used as the first estimate for the starting position of the user receiver.

The grid network search is conducted in total twice: first for a coarse grid network, which covers the entire area of the navigation environment, and second for a fine grid network, which is spanned around the previously selected candidate for the coarse grid network.

Figure 5:
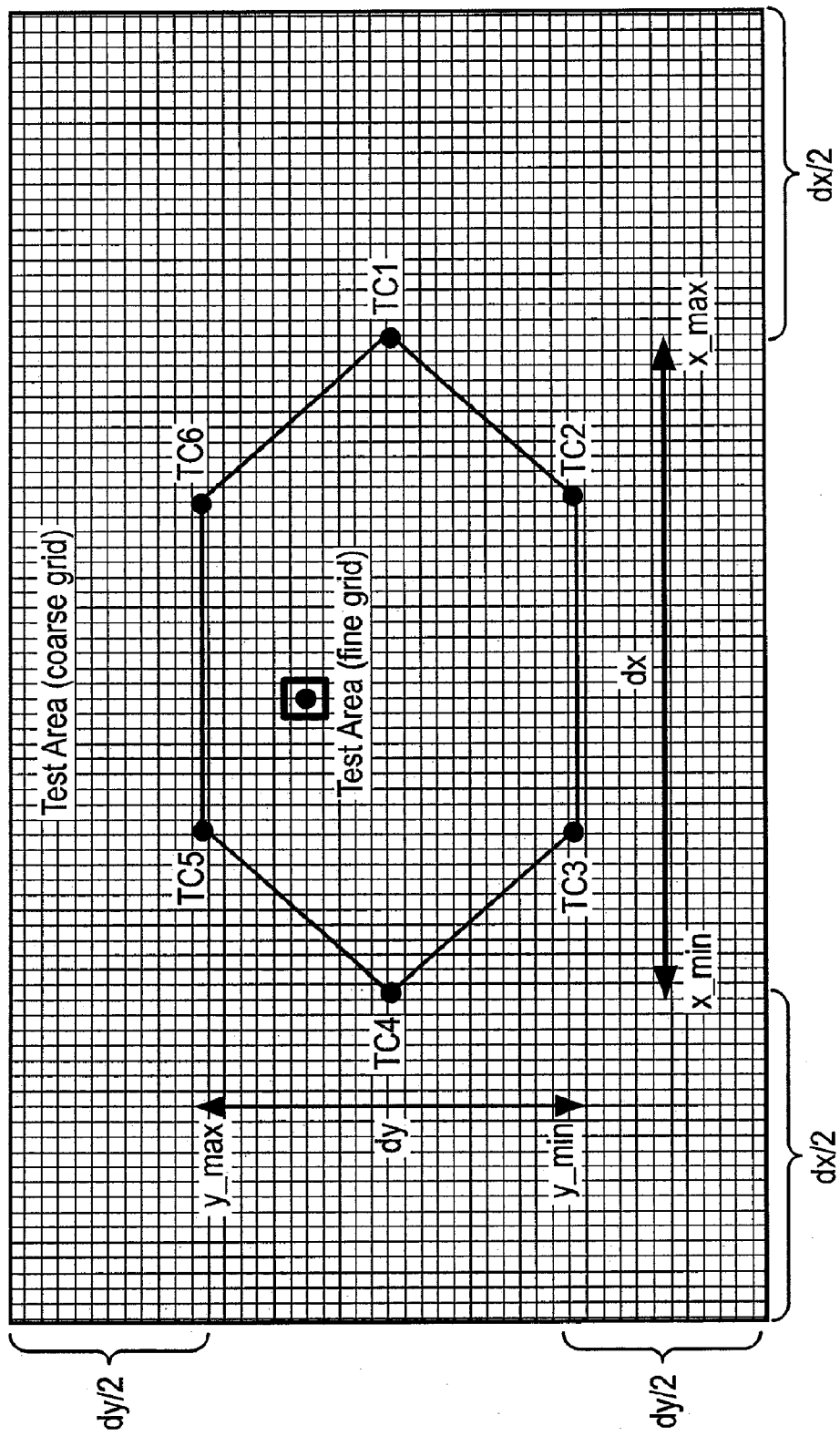
FIG. 5 an embodiment of a two dimensional test area for the grid network-based search.

The extent of the test area, in which the search for the starting position for the user receiver is to be conducted, is determined by the coarse-calibrated TC coordinates (cf. FIG. 5).

Figure 6:
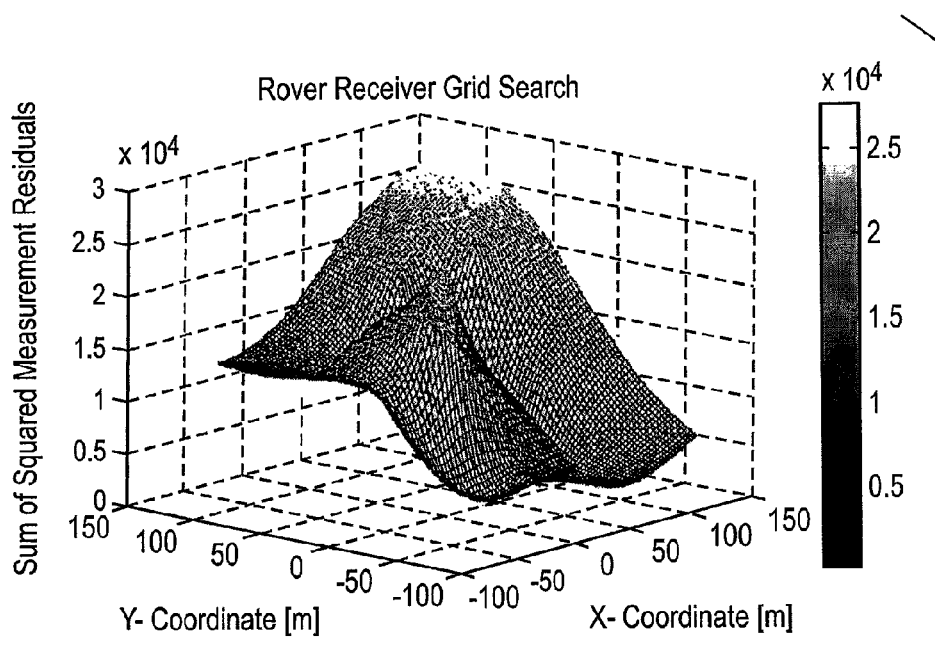
FIG. 6 examples for the sum of squared measurement residuals as a function of the estimated user receiver starting position (left: coarse grid raster; right: fine grid raster).
Figure 6:
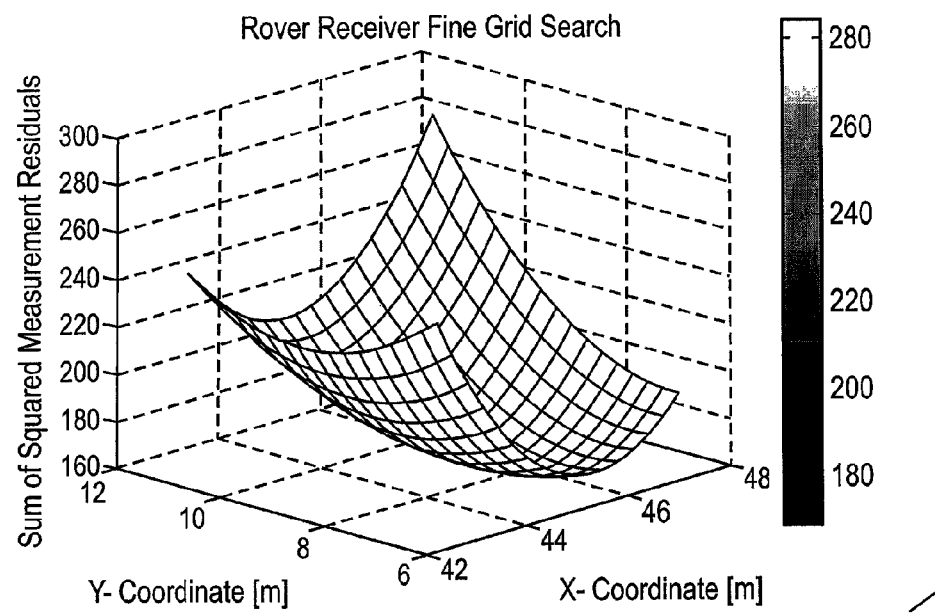

If a three dimensional TC network is to be self-calibrated, the grid network is correspondingly spanned spatially instead of planarly. Then the grid network is composed of a plurality of individual cubes. FIG. 6 illustrates how the global minimum of squared measurement residuals can be found by the grid network search.

2) Estimating the Trajectory of the Utilization System and/or User Receiver

In order to be able to carry out a fine calibration of the TC network, it is necessary that the user receiver moves in the operating area and that the receiver data of the reference TC and the user receiver are plotted during the trajectory. In order to be able to calculate a phase solution for the fine calibration, the ambiguities of the phase measurements are successfully solved. As long as no phase jumps occur, the ambiguities remain constant during the user trajectory. At the beginning of the user trajectory the equation system, which is based on the use of phase measurements, is undefined. Not until there are several sample times during the user trajectory for the calculation in the post-processing can the system of equations be solved.

For the first estimate of the user receiver trajectory the double differenced phase measurements are used:

$$\nabla \Delta \phi_{Ro,PLR_{Ref}}^{PLT_{REF},PLT_N}(t) = r_{Ro}^{PLT_N}(t) - r_{PLR_{REF}}^{PLT_N} - r_{Ro}^{PLT_{REF}}(t) + \quad \text{Equation (10)}$$
$$r_{PLR_{REF}}^{PLT_{REF}} + \nabla \Delta N_{Ro,RLR_{REF}}^{PLT_{REF},PLT_N} \cdot \lambda + \nabla \Delta v_{\phi\_Ro,PLR_{REF}}^{PLT_{REF},PLT_N}(t)$$

where
φ: phase measurement (unit: meters)
r: slant range
N: ambiguities (unit: cycles)
λ: wavelength
vφ: phase noise on the basis of all error sources (receiver noise, multipath propagation).

An estimate of all positions, which the user occupies during its trajectory, is carried out by a nonlinear iterative minimization of the squared measurement residuals. The result is a linearization of the phase measurements according to user receiver coordinates. In this case the ambiguities at the beginning of the trajectory are still set up as known. For the linearization during the user trajectory it is assumed that the user receiver does not move between two successive observation cycles. Thus, the preceding user position can be used as the start value for the next linearization. A standard iterative least square (ILS) method is used in order to determine the user position for the respective sample time epoch.

Application of the Gauss-Newton method for minimizing the squared measurement residuals:

$$\underline{x}_{i+1} = \underline{x}_i - (J^T \cdot P \cdot J)^{-1} \cdot J^T \cdot P \cdot \underline{r} \qquad \text{Equation (11)}$$

where
$\underline{x}$ unknown system states
J Jacobi matrix
$\underline{r}$ measurement residual vector
P correlation matrix
The index i stands for the i-th iteration.

3) Fine Calibration

In the described embodiment under discussion, the fine calibration of the TC network is based, compared to the coarse calibration, exclusively on the application of low noise phase measurements. The pseudorange measurements, which are used for the coarse calibration, have the advantage that they do not exhibit any ambiguities. However, the pseudorange measurements are subject to much more noise, a state that is reflected in the accuracy of the self-calibration. Since the accuracy of the self-calibration should fall within the centimeter range, an additional follow-up fine calibration is carried out after the coarse calibration. The results gained from the coarse calibration and the estimate of the user trajectory are used as the starting point for the linearization, which takes place in the course of the fine calibration. In this case not only the time invariant TC coordinates and the time dependent user coordinates set up as unknown, but also the time invariant ambiguities of the phase measurements are also set up as unknown. The result is a nonlinear optimization problem. For the fine calibration of the system, a quadratic iterative least square (QILS) method can also be used, instead of a standard ILS method. For the linearization according to the unknown system parameters one does not terminate until after the quadratic term. The phase measurement, shown in equation 10, has to be linearized according to the TC coordinates, the user coordinates at sample time to and the initial ambiguities. The termination during linearization only after the quadratic term has the advantage that in the case of poor starting approximations due to the coarse calibration of the system the nonlinear optimization is improved to the effect that it converges, nevertheless. The QILS algorithm that is used can correspond to the algorithm that is shown in the article "Self-Calibration of Pseudolite Arrays Using Self-Differencing Transceivers" by LeMaster referenced above. However, in the approach that is described here as compared to the approach of LeMaster, double differenced observation equations are used, instead of self differenced observation equations, because the user is designed as a pure receiver and not as a transceiver. Thus, the term, in which the sought system variables occur in the nonlinear form, changes to:

$$r_{Ro}^{PLT_N}(t) - r_{PLR_{REF}}^{PLT_N} - r_{Ro}^{PLT_{REF}}(t) + r_{PLR_{REF}}^{PLT_{REF}} = \qquad \text{Equation (12)}$$
$$\sqrt{(x^{PLT_N} - x_{Ro}(t))^2 + (y^{PLT_N} - y_{Ro}(t))^2 + (z^{PLT_N} - z_{Ro}(t))^2}$$
$$- \sqrt{(x^{PLT_N})^2 + (y^{PLT_N})^2 + (z^{PLT_N})^2} -$$
$$\sqrt{(x_{Ro}(t))^2 + (y_{Ro}(t))^2 + (z_{Ro}(t))^2}$$

As stated in the previous approaches, it is also assumed in this case that the TX antenna and the RX antenna of the same TC are located at the same place. Equation 12 already takes into consideration that the reference TC shall be located by definition in the coordinate origin (0|0|0).

The measurement residuals of the double differenced phase measurements can be divided by approximation into a linear term and into a quadratic term:

$$\delta \nabla \Delta \underline{\phi}_k = J_k \cdot \delta \underline{x}_k + Z(\delta \underline{x}_k) \cdot H_k \cdot \delta \underline{x}_k \qquad \text{Equation (13)}$$

where H is the Hesse matrix, and k is used as the loop index for the respective iteration.

The nonlinear equation system, shown in equation 13, can be solved in two separate steps by approximation. In the first step an approximation for Z is found by determining first $\delta \underline{x}'_k$ by means of a standard ILS method (see Gauss-Newton method).

$$\delta \underline{x}'_k = (J_k^T \cdot P \cdot J_k)^{-1} \cdot J_k^T \cdot P \cdot \delta \nabla \Delta \underline{\phi}_k \qquad \text{Equation (14)}$$

At this point the nonlinear equation 13 can be approached through equation 15:

$$\delta \nabla \Delta \underline{\phi}_k = K_k \cdot \delta \underline{x}_k$$

where $$K_k = J_k + Z(\delta \underline{x}'_k) \cdot H_k \qquad \text{Equation (15)}$$

In the second step the correction term $\delta \underline{x}_k$ for the unknown system states can be calculated as follows:

$$\delta \underline{x}_k = (K_k^T \cdot P \cdot K_k)^{-1} \cdot K_k^T \cdot P \cdot \delta \nabla \Delta \underline{\phi}_k \qquad \text{Equation (16)}$$

Iterations of the QILS method are carried out until either the convergence criterion or the divergence criterion is fulfilled and/or until the maximum allowable number of iterations was exceeded.

In the case that the coarse calibration yields poor starting approximations for the unknown system variables, the fine calibration is repeated using the starting approximations that vary from the coarse calibration results. Altogether the system solution that leads to the minimum sum of squared measurement residuals is accepted.

LIST OF REFERENCE NUMERALS 10 coarse calibration of the coordinates of the transceiver
12 estimate of the trajectory of the utilization system
14 fine calibration of the coordinates of the transceivers and the trajectory of the utilization system on the basis of the coarse calibration and the estimate of the trajectory
16 triangulation
18 grid network search
20 iterative least square approach
22 iterative least square approach
30 actual position of the TCs in the network
32 position in the local coordinate system after the self-calibration The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatically determining a position of transceivers of navigation signals using a utilization system for navigation signals, the method comprises the steps:

a) coarsely calibrating coordinates of the transceivers;

b) estimating a trajectory of the utilization system; and c) finely calibrating the coordinates of the transceivers and the trajectory of the utilization system on the basis of the coarse calibration and the estimated trajectory, wherein a distance between two transceivers is determined in the coarse calibration.

2. The method of claim 1, wherein self differenced observation equations are used for the coarse calibration.

3. The method of claim 1, wherein after the distance between all transceivers has been determined, a rough estimate of the coordinates of the transceivers is made by triangulation of the determined distance between the transceivers.

4. The method of claim 3, wherein in order to determine the coordinates of the transceivers, a local coordinate system is used, and the optimal position of the coordinate system with respect to the transceivers is automatically sought.

5. The method of claim 1, wherein after step a), a starting position of the utilization system is determined before step b) is carried out.

6. The method of claim 5, wherein double differenced pseudoranges are used as an observation variable for a first estimate of the starting position of the utilization system.

7. The method of claim 5, wherein the starting position of a utilization system is determined by a grid network search based on a minimization of measurement residuals.

8. The method of claim 7, wherein a sum of squared measurement residuals is determined for each grid network point and used as a test variable, in order to differentiate between different test candidates of the grid network points for the starting position.

9. The method of claim 8, wherein the grid network point that yields the minimum sum of squared measurement residuals is selected as the first estimate of the starting position.

10. The method of claim 9, wherein the grid network search is carried out with a coarse grid network, which covers the total area of a navigation environment, and then with a fine grid network, which is spanned around the selected grid network point.

11. The method of claims 10, wherein dimensions of a test area for determining the starting position of the utilization system are determined using the coarse-calibrated coordinates of the transceivers.

12. The method of claim 11, wherein the trajectory of the utilization system is estimated using an iterative least square approach while simultaneously exploiting small dynamics of the utilization system in a linearization of the observation equations.

13. The method of claim 12, wherein only low noise phase measurements of the navigation signals, transmitted by the transceivers, are used for the fine calibration of the coordinates of the transceivers and the trajectory of the utilization system.

14. The method of claim 13, wherein the fine calibration of the coordinates of the transceivers and the trajectory of the utilization system is carried out using an iterative least square approach.

15. The method of claim 14, wherein the iterative least square approach comprises a standard or quadratic iterative least square method.

16. The method of claim 15, wherein double differenced observation equations are used.

17. The method of claim 16, wherein iterations are carried out in accordance with the iterative least square approach until either the convergence criterion or the divergence criterion is fulfilled, or the maximum allowable number of iterations is exceeded.

18. The method of claim 17, wherein the fine calibration is repeated using the results that vary from the results of the coarse calibration.

19. Computer program product, which comprises a machine readable program carrier, on which a computer program is stored in the form of electronically or optically readable control signals wherein when the computer program is executed by a computer the computer:

a) coarsely calibrates coordinates of the transceivers;

b) estimates a trajectory of the utilization system; and c) finely calibrates the coordinates of the transceivers and the trajectory of the utilization system on the basis of the coarse calibration and the estimated trajectory, wherein a distance between two transceivers is determined in the coarse calibration.

20. A device that automatically determines a position of transceivers of navigation signals using a utilization system for the navigation signals, and which comprises:

a memory; and a processor, the processor executes a program from the memory to a) coarsely calibrate coordinates of the transceivers, including determining a distance between two transceivers;

b) estimate the trajectory of the utilization system; and c) finely calibrate the coordinates of the transceivers and the trajectory of the utilization system on the basis of the coarse calibration and the estimated trajectory.

* * * * *